United States Patent
Munoz et al.

(10) Patent No.: US 6,356,938 B1
(45) Date of Patent: Mar. 12, 2002

(54) SYSTEM AND METHOD FOR TRANSMISSION OF INFORMATION PACKETS BETWEEN PROVIDER AND CONSUMER PROCESSORS

(75) Inventors: Jose L. Munoz, Waterford; W. Robert Bernecky, Mystic, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/303,809

(22) Filed: Sep. 9, 1994

(51) Int. Cl.[7] .............................................. G06F 15/16
(52) U.S. Cl. ...................................... 709/208; 709/245
(58) Field of Search .................... 345/200; 395/200.08; 709/208, 245

(56) References Cited

U.S. PATENT DOCUMENTS

| | | | | |
|---|---|---|---|---|
| 4,862,350 A | * | 8/1989 | Orr et al. ..................... | 395/250 |
| 5,214,759 A | * | 5/1993 | Yamaoka et al. ...... | 395/200.08 |
| 5,329,619 A | * | 7/1994 | Page et al. ............. | 395/200.01 |

* cited by examiner

Primary Examiner—Mehmet B. Geckil
(74) Attorney, Agent, or Firm—Michael J. McGowan; Michael F. Oglo; Prithvi C. Lall

(57) ABSTRACT

An inventive mapped memory interface product and process are provided. The inventive product carries out the steps of transmitting an information packet between a provider and a consumer processor; using the information packet to map a portion in a shared memory to which data will be transferred from a provider processor and from which the data will be extracted via a consumer processor; using the information packet to tell the consumer processor where the data is located; directing the local memory of both the provider processor and consumer processor to the portion mapped in the shared memory; transferring data from the provider processor to the mapped portion in the shared memory; and extracting the data from the mapped portion of the shared memory and transferring it in the local memory of the consumer computer.

11 Claims, 3 Drawing Sheets

SYSTEM AND METHOD FOR TRANSMISSION OF INFORMATION PACKETS BETWEEN PROVIDER AND CONSUMER PROCESSORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention is directed toward data transfer in multi-processor systems, and more particularly, toward a process for significantly increasing the speed at which data may be throughput between processors via a shared memory.

(2) Description of the Prior Art

Multi-processing systems using a central location from which to store and retrieve data, as well as for sending data between processors comprising the system, are becoming increasingly more popular. Such systems allow for the use of a single memory or central storage area which can be accessed by a plurality of stations. Data work products and the like can be transferred between stations in the system without having to physically transfer floppy disks.

Frequently, a central data base or disk drive is used for storing the data of the individual stations. As the systems become increasingly large, the data stored at the central data base or disk drive also becomes increasingly large. At some point in the use of the system, the data base can be filled with so much data that processing data transfer between stations becomes significantly slowed. Data transfer between multi-processors while using a central disk drive has disadvantages. As is well known in computer technology, retrieving data from a disk drive is significantly slower than retrieving data directly from memory. Using a shared memory in place of a shared disk drive has a significant speed advantage over the same.

The downside to using a shared memory to store data is that space is significantly limited as compared to a disk drive. In order to use a central memory efficiently, it is best to remove data stored therein immediately. It is frequently the case, however that all the information stored in memory is not necessarily the information which is desired to be transmitted to a station of the multi-processor system. Therefore, it is beneficial to provide a means or process for communicating to a station of a multi-processor system from another station, exactly where the data desired for transfer is located in memory.

While the prior art discussed below discloses the use of a memory which may be shared by a plurality of stations comprising a multi-processor system, the transmission of data via the central memory in the systems discussed below is not facilitated by the efficient and inventive process disclosed herein, and thereby such data transfers are inherently significantly slower.

U.S. Pat. No. 4,212,057 to Devlin et al. discloses a shared memory multi/micro processor computer system. The system includes two or more substantially independent processors each having its own bus-type interconnection structure. A shared memory is accessible by any of the processors without interfering with the proper operation of another of the processors. Access to the shared memory is controlled such that a processor is connected to the shared memory only when one request is present. When more than one request is received from the processors, the last processor having received access is given priority to access the shared memory. While a shared memory is used in Devlin et al., there exists no means for improving the efficiency of removing data from the shared memory. That is, the Devlin et al. system fails to provide a means for quick access to the data being transferred, thereby decreasing the efficiency with which the system could perform.

U.S. Pat. No. 4,410,944 to Kronies discloses an apparatus and method for maintaining cache memory integrity in a shared memory environment. Kronies discloses a data processing system having a plurality of processors and a plurality of dedicated and shared memory stations. Each processor includes its own cache for speeding up data transfers between the processor and the shared memory. The integrity of the data in each individual cache, with respect to data written on similar addresses in the shared memory, is maintained by providing the shared memory with a cache monitoring and control system. The system monitors the read and write requests of the processors and in response, maintains an accurate and updatable record of the data addresses used in each individual cache for preventing the same addresses from being overridden, and thereby protecting the integrity of the data. High speed exchange of data from a first processor to a second processor is not disclosed in the Kronies patent. In fact, in Kronies, the data in the shared memory must be scanned before reading and writing requests can be fulfilled, thereby slowing the process by which data is transferred. For such applications, it would be beneficial to facilitate communication between processors prior to the transference of the data. As such, the possibility of threatening the integrity of the data stored could be prevented while increasing throughout instead of delaying it.

U.S. Pat. No. 4,975,833 to Jinzaki discloses a multi-processor system which only allows alternate access to shared memories upon the reception of read and write request signals. The system incorporates lock-out and access flags and a control circuit for controlling access to shared local memories of a group of processors. The lock-out flag inhibits reading from the memory of another processor while the other processor is writing into the memory. The access flag permits reading of the memory by the other processor and inhibits a related processor from writing into the memory while access is given. The Jinzaki system is directed towards sharing local memories and does not incorporate a central memory. The Jinzaki system includes a process for preventing access to data after storage, via communication between processors after storage, thereby slowing data throughput.

U.S. Pat. No. 4,803,618 to Ita et al., discloses a multi processor system having a common memory. The system includes a plurality of processors which use a common memory under a time division control plan. With this system, the common memory is protected from erasure of data stored therein via use of write permission flags given from a master processor. A control unit is operative to receive a write request flag from a processor as well as a write permission flag from the master processor. If both flags are generated simultaneously, the control unit provides a write enable signal for activating the common memory and allowing access thereto. An additional control unit is provided for staggering access to the common memory upon request from a plurality of processors. The Ita et al. system, therefore, provides a means for denying access to a central memory after data has been stored therein, which slows data throughput.

There exists a need in the multi-processor system art for a high speed data transfer process which allows a plurality of processors to prepare for acquiring access of data, prior to its transference to a central memory, so as to provide an efficient data transfer system.

SUMMARY OF THE INVENTION

The primary object of this invention is to provide a system and process for significantly increasing the efficiency of data transfer within multi-processor systems.

Another object of this invention is to provide a process and system for increasing the rate of data transfer between at least two computers of a multi-processor systems which can be implemented with currently available interfacing hardware.

Yet another object of this invention is to provide a high speed data transfer process for use between at least two computers of a multi-processor system using a shared memory.

The foregoing objects are attained by the inventive mapped memory interface process and computer program product of the present invention which process includes providing a provider computer and a consumer computer, each having a local memory and each linked to a shared memory; selecting data stored in the local memory of the provider computer for transfer from the local memory of the provider computer to the shared memory; mapping a portion of the shared memory having a known address for the storage of data; communicating the address of the mapped portion to the consumer computer prior to transferring the data; transferring the selected data from the local memory of the provider computer to the known address in the shared memory; and accessing the selected data in the shared memory at the particular address of the mapped portion of the shared memory; and extracting the selected data from the shared memory and transferring it into the local memory of the consumer computer.

The process also includes allocating a portion of the shared memory to the process in accordance with the amount of data to be transferred via a master processor; communicating to the provider processor that the consumer processor is ready to extract data from the shared memory; communicating to the consumer processor that the data has been transferred into the mapped portion; signaling to the provider processor that the data has been extracted; and updating the mapped portion with more data from the provider processor.

In one embodiment, the process of the present invention is carried out by a plurality of processors having the ability to map a set of addresses, for use with data desired to be transferred, into a shared memory location. This embodiment also includes an information packet being comprised of computer readable program code including process and data identifiers, the addresses and the size of the shared memory which is to be mapped. Accordingly, in this embodiment, at least two computers communicate along a bus-line, a packet of information regarding the address at which data will be stored in a shared memory prior to the storage of the same therein. The provider computer then transfers the data desired to be transmitted to the shared memory at the selected addresses. The consumer computer, informed of the addresses of the data prior to its transfer, can then extract the data from the shared memory into its local memory. Rapid data transfer between computers can be achieved without the bottle necking which occurs in systems which use lock-out flags or the like for preventing access to data in shared memory, which is being used by another processor.

The details of the present invention are set out in the following description and drawings wherein like reference characters depict like elements.

DETAILED DESCRIPTION OF THE PREFERRED EMBODIMENT

Figure 2:
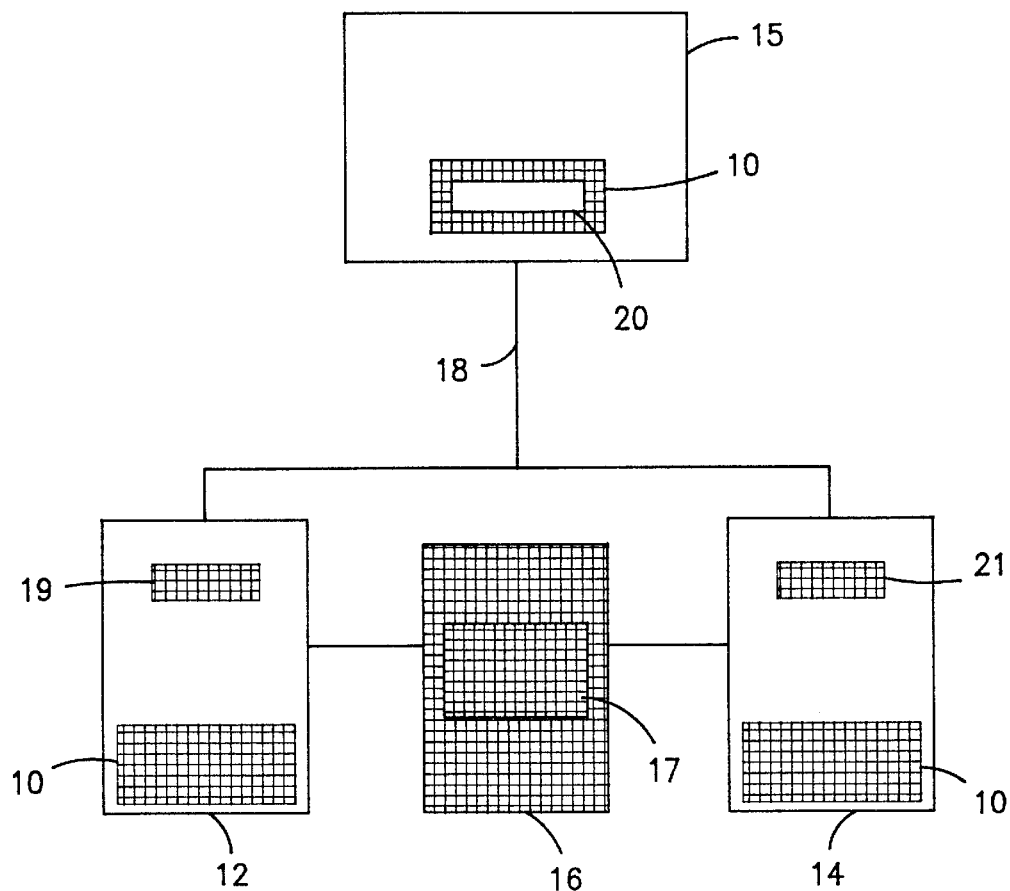
FIG. 2 is a block diagram of a provider and a consumer computer, a shared mapped memory, a master processor and a communication link and as between the computers in accordance with the principles of the present invention.
Figure 1:
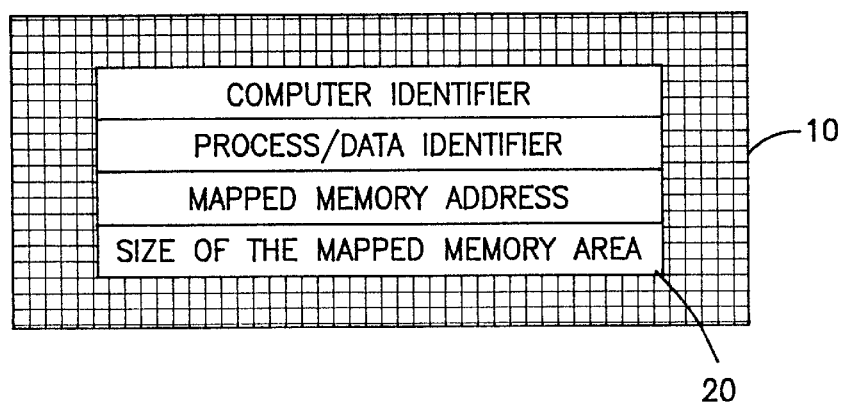
FIG. 1 is a block representation of an information packet as a part of a computer usable medium.

Referring now to the drawings and detail, there is shown in FIG. 1, a block diagram of the inventive computer usable medium, having computer program product for carrying out the data transference process in accordance with the principle of the present invention, designated generally as 10. Referring next to FIG. 2, the medium 10 is for implementation with a provider computer 12, a consumer computer 14, a master processor 15, and a shared memory 16 which are connected for communication via a communication link 18, as shown in FIG. 2.

For implementing the process of data transfer to be described hereinafter, most multi-processor systems known in the art can be used. Of primary importance for any system chosen is that a shared memory is used which is capable of being mapped by all the computers or processors involved in the system.

Referring still to FIG. 2, provider computer 12 is connected to consumer computer 14 via a communication link 18. Communication link 18 is preferably a network cable such as ethernet, or any suitable communication means well known in the art. Each of the computers 12 and 14 are also linked to shared memory 16, to which each computer has equal access. Shared memory 16 is used as a means for unloading data from provider computer 12 and loading data onto consumer computer 14. Master processor 15 is also linked with computers 12 and 14 via communication link 18, for and controlling the exchange of information between the computers. However, it should be recognized that computer 15 is optional. If it is not present, then computer 12 or computer 14 can act in a dual role, serving as both the master processor and the provider, or the master processor and the consumer.

Shared memory 16 is divided into sectors and the like which can be identified via addresses as particular locations for the data, as shown in FIG. 2 as addressed memory portion 17. Computers 12 and 14 are each linked to shared memory 16 via a bus-line or other sufficient interface so that data can be transferred into and out of shared memory 16 via input and output ports. Each of the computers 12 and 14 has a local memory 19 and 21, respectively, therein for the storage of the data which is to be transferred. Shared memory 16 and local memories 19 and 21 may be in any suitable form including hard discs, or other memory types.

The computer usable medium 10, if part of local memory 19 will be in the same form but if separate from local memory 19, may be of any suitable form such as, for example, a floppy disc or the like. In accordance with the invention, master processor 15 communicates with both provider computer 12 and consumer computer 14 as to the identity of and the location of the data, via addresses, in shared memory 16. Accordingly, consumer computer 14 can access shared memory 16 at the given addresses for efficiently extracting the data transferred from provider computer 12.

Communication between the computers 12 and 14 is preferably accomplished via information packet 20, shown in FIG. 1 as part of medium 10. Information packet 20 includes information such as computer identification numbers, data identifiers, the address of the data in the shared memory, and the size of the shared memory to be mapped and used by the process. Information packet 20 is communicated over communication link 18 from master processor L5 and is comprised of computer readable program code on computer usable medium 10 and functions to facilitate the aforementioned communication between the computers 12 and 14.

In addition to master processor 15 including information packet 20, computers 12 and 14 each include additional computer readable program code which further comprises computer usable medium 10. The additional code functions to allow computers 12 and 14 to carry out the steps of the process described below in response to prompts by master processor 15 and in response to steps taken by the other computer.

Figure 3:
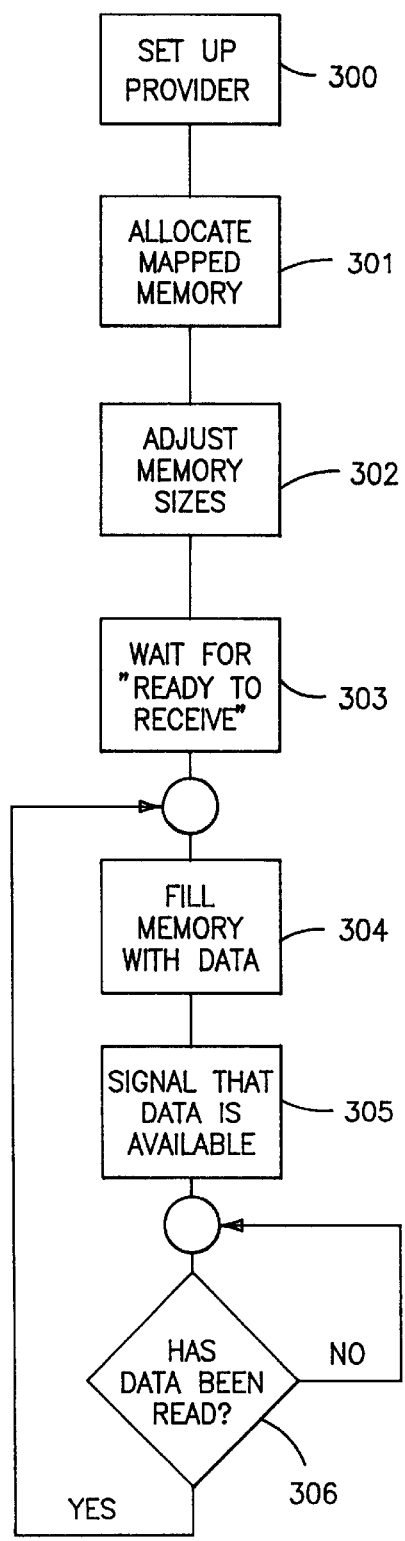
FIG. 3 is a flow chart representing a process in accordance with the present invention of a provider computer transferring data to a shared memory.
Figure 4:
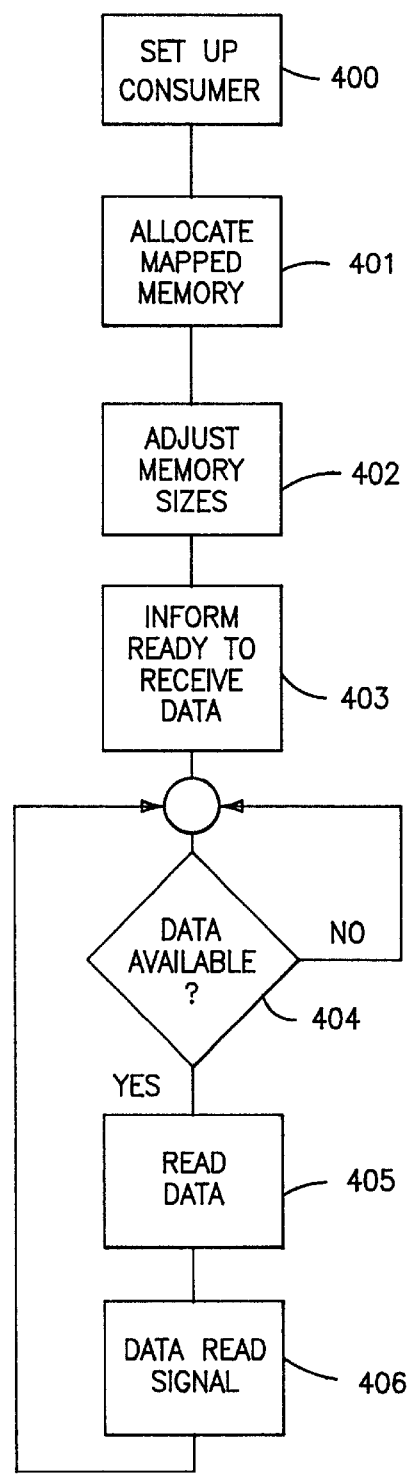
FIG. 4 is a flowchart representing a process in accordance with the present invention of a consumer computer extracting data from the shared memory.

Via the aforementioned equipment, the processes shown in FIGS. 3 and 4 can be carried out. FIG. 3 represents the process of data transfer in accordance with the present invention used by the provider computer 12 and FIG. 4 represents the process of data transfer, particularly the receiving of the data, in accordance with the present invention for the consumer computer 14. While the processes are shown separately in FIGS. 3 and 4, they are not unrelated. That is, various steps of each process depend on a response received from or step taken by the other computer.

The first three steps of the processes shown in FIGS. 3 and 4, respectively, for computers 12 and 14, respectively, are preferably the same. Steps 300 and 400 are each responsible for setting up the communication required between provider computer 12 and the consumer computer 14 in order to control the processes shown. In these steps 300 and 400, information packet 20, shown in FIG. 1, is transmitted via communication link 18, shown in FIG. 2, from master processor 15 to provider computer 12 and to consumer computer 14.

As discussed, information packet 20 includes several important features which are needed to carry out the process disclosed herein. The packet includes a computer identifier for telling the receiving, or consuming computer 14, which computer it will be obtaining data from. The packet also includes an identifier for the data so as to tell the consumer computer 14 what information it is going to receive. Most importantly, information packet 20 includes addresses as to where the data will be stored in shared memory 16, thus mapping a portion 17 of shared memory 16 for the data. The computers are arranged so that they may each access the now mapped shared memory portion 17 by using the same addresses. Thus, information packet 20 includes the addresses within shared memory 16 to which the data will be transferred from provider computer 12 and communicates the same to both computers. Information packet 20 is put into operation via a master processor.

Accordingly, when the process used by consumer computer 14 is at the point where extraction of the data is the next step, consumer computer 14 knows exactly where to access shared memory 16 for extracting the data.

Blocks 301 and 401 include the step of setting aside the selected portion 17 of shared memory 16 into which the data will be stored for access by consumer computer 14. Accordingly, the information packet allows each computer involved in the exchange of information, i.e., provider computer 12 and consumer computer 14, to point its local memory 19 and 21, respectively, to the same portion 17 of shared memory 16 so that efficient transfer of data therebetween can be accomplished.

In steps 302 and 402, the amount of shared memory 16 shared between the two computers 12 and 14 is allowed to be modified so that less or more shared memory may be set aside for the transfer depending on the amount of data there is. A default setting is used initially which is set to a particular memory size. If, however, less or more memory is desired or necessary, it may be changed via user input into master processor 15 and the transmission of information packet 20. Accordingly, such modification of the memory is accomplished over communication link 18 via information packet 20 which monitors the initial size of the shared memory 16 and the amount of data for transfer. At the point where shared memory 16 must be adjusted, each computer is told so by a user over communication link 18 through master processor 15. As a result of the ability to change the size of the shared memory, more memory space can be made available for other operations. At this point in the entire process, each of the computers 12 and 14 take on different process steps.

Prior to transmitting the data to shared memory 16, in step 303, provider computer 12 waits for a signal from consumer computer 14 over communication link 18 indicating that consumer computer 14 is ready to extract data from shared memory 16 at portion 17. Consumer computer 14 will be prepared, after the data from the information packet is received and processed to go directly to the location of the data, via the addresses exchanged, to extract the data. When consumer computer 14 is ready to receive the data, block 403 represents the step in the process where computer 14 sends a signal, via communication link 18, indicating to provider computer 12 that it is ready to receive and extract data from shared memory 16. Once the signal is received, block 304 represents the step wherein provider computer 12 fills up mapped portion 17 of shared memory 16 with the data designated for transfer. Block 404 simply represents consumer computer 14 waiting for the signal in step 304 from provider computer 12, that the data is available in the mapped portion of shared memory 16 for extraction by consumer computer 14.

After the data has been sent to shared memory 16, at the addresses agreed upon, as represented by step 305, provider computer 12 preferably signals consumer computer 14 that the data is available. When the signal is received that the data is available for extraction, the extracting step begins. Represented by step 405 in FIG. 4, data is accessed and extracted from mapped portion 17 of shared memory 16 via a read step in synchronous relationship consistent with the previously agreed upon size of mapped portion 17 of shared memory 16 and at the previously agreed upon address of the same.

Step 306 of FIG. 3 represents provider computer 12 waiting for a signal from consumer computer 14 that the data has been successfully extracted from shared memory 16 at the agreed upon address of portion 17. Consumer computer 14 then sends a signal, as represented by step 406, which indicates that the data has been extracted and consumed by consumer computer 14. When provider computer 12 receives this signal from consumer computer 14, it returns to step 304 and updates the memory with new data at the same agreed upon address. Simultaneously, consumer computer 14 returns to step 404 wherein it awaits for additional data for extraction at the agreed upon address. Steps 304, 305, 306 and steps 404, 405 and 406 are executed and repeated in a loop until the process is terminated or until all the data is transferred from provider computer 12 to consumer computer 14.

Figure 5:
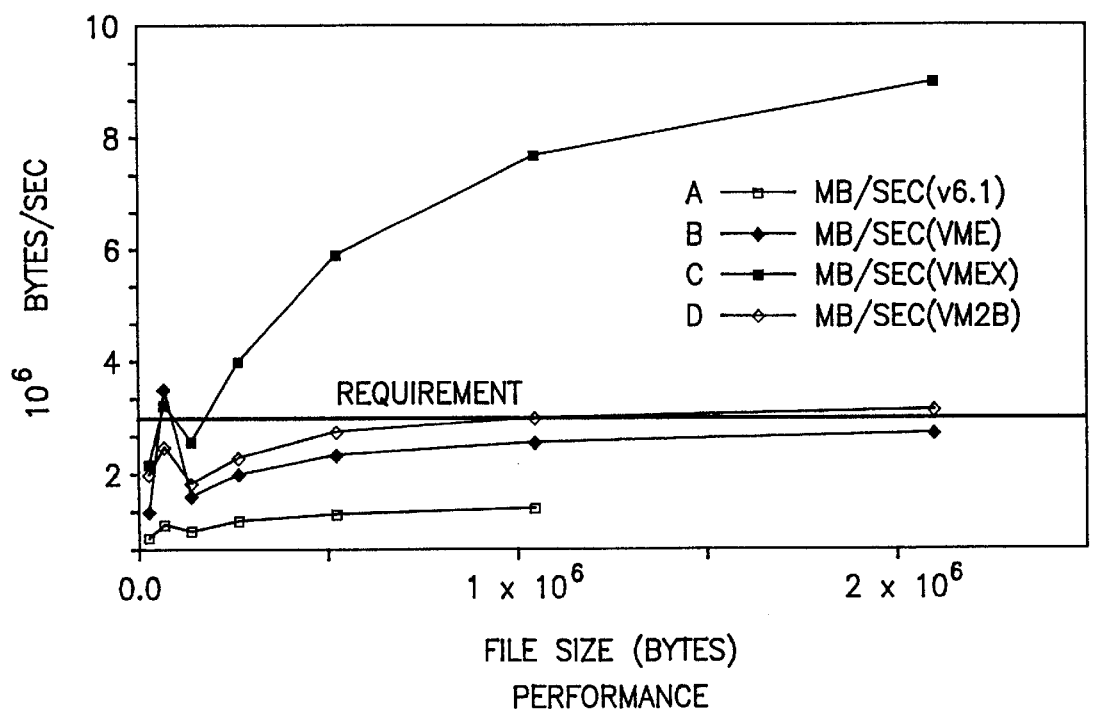
FIG. 5 is a graph showing the improvements achieved in the rate of data transfer with the instant invention.

FIG. 5 is a graph representative of the advantages in using the instant invention with the prior art. Line A of FIG. 5 is representative of the data throughput rate available with prior art systems. Line B shows that by using the present system, throughput of data was increased from $1.5 \times 10^6$ Bytes/sec. to $2.7 \times 10^6$ Bytes/sec. Line C, representing an ideal situation wherein the process disclosed herein is not limited by the equipment used and mapped memory is consumed as quickly as possible, shows that rates as high as $9 \times 10^6$ Bytes/sec. can be achieved. To further extend the capabilities of the process disclosed with existing equipment, double buffering, can be used to achieve rates on the order of $3.5 \times 10^6$ Bytes/sec., as indicated by line D of FIG. 5.

Additional alternatives to the embodiment described above include using control signals (in contrast to messages) between the computers instead of the communications link shown in FIG. 2 or using a system in which the computers involved could monitor the mapped memory. An example of using control signals would be to employ signal protocols available on a bus line.

A further alternative includes each computer running more than one of the single processes shown in FIGS. 3 and 4. This can be achieved via the information packet wherein multiple processes, similar to those shown in FIGS. 3 and 4, run by the provider computer could be tied to respective and responsive multiple processes run by the consumer computer. A master process controller would be used with each computer, to guarantee that mapped memory addresses do not overlap or to control desired overlapping. Each process to be run by a computer would first be registered with the master controller to communicate to the master controller the amount of shared mapped memory that is required to run that data transfer process. The master controller would then insert into the information packet the next available address of shared mapped memory that is large enough to hold the data transfer of the size requested.

The primary advantage of this invention is that it provides a system and process for significantly increasing the efficiency of data throughput between computers of multi-processor systems. Another advantage of this invention is that it provides a process and system for increasing the rate of data transfer between at least two computers of a multi-processor system, which can be implemented with currently available interfacing hardware. Another advantage of this invention is that a high speed data transfer system and process is provided for use between at least two computers of a multi-processor system via a shared memory.

It is apparent that there has been provided in accordance with this invention a Mapped Memory Interface For Communication Between Multiple Computers which fully satisfies the objects, means, and advantages set forth hereinbefore. While the invention has been described in combination with specific embodiments thereof (including the hereinbefore described alternative of computer 12 or 14 acting in a dual role to perform the function of computer 15), it is evident that many other alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for improving the transfer of data between computers in a multi-processor system via a shared memory, comprising the steps of:

providing a provider computer and a consumer computer, each having a local memory and each linked to said shared memory;

selecting data stored in the local memory of said provider computer for transfer from the local memory of said provider computer to the shared memory;

mapping a portion of said shared memory having a known address for the storage of said data;

communicating the address of the mapped portion to said consumer computer prior to transferring said data;

transmitting a first signal to said provider computer that said consumer computer is ready to receive and extract data from said shared memory;

transferring said selected data from said local memory of said provider computer to said known address in said shared memory after said provider computer receives said first signal;

transmitting a second signal from said provider computer to said consumer computer that said selected data is available in said mapped portion for extraction by said consumer computer;

accessing said selected data in said shared memory at said particular address of said mapped portion of the shared memory with said consumer computer after receipt of said second signal from said provider computer and extracting said selected data from said shared memory and transferring it into the local memory of said consumer computer; and transmitting a third signal from said consumer computer to said provider computer that said selected data has been extracted.

2. The process of transferring data according to claim 1, further comprising the step of updating said mapped portion in said shared memory with more data from said provider computer.

3. The process of transferring data according to claim 1, wherein said mapping step comprises:

providing a master processor; and transmitting an information packet from the master processor to the provider and consumer computers, wherein said information packet includes the identity of the provider and consumer;

computers and the size and the address of the mapped portion of shared memory.

4. The process of transferring data according to claim 1, further comprising the step of modifying the amount of shared memory to be consumed by said data in accordance with the amount of said data to be transferred.

5. A computer program product for use with a multi processor system for facilitating the transference of data between a local memory of a provider computer and a shared memory and between said shared memory and a local memory of a consumer computer, comprising:

computer readable program means for causing an addressed portion in said shared memory having a particular address to be mapped for the transference of said data thereto;

computer readable program means for communicating the address of said portion to said computers;

computer readable program means for transmitting a first signal to said provider computer that said consumer computer is ready to receive and extract data from said addressed portion of said shared memory;

computer readable program code means for instructing said provider computer to transfer said data to said mapped portion at said address in said shared memory after receipt of said first signal;

computer readable program code means for transmitting a second signal from said provider computer to said consumer computer that said data is available in said mapped portion for extraction by said consumer computer;

computer readable program code means for allowing said consumer computer to extract said data from said mapped portion to said address in said shared memory; and computer readable program code mans for transmitting a third signal from said consumer computer to said provider computer that said data has been extracted.

6. The computer program product according to claim 5, further comprising computer readable program code means for causing the size of said shared memory to be consumed by said data to be modified in accordance with the amount of said data to be transferred based on user input commands.

7. The computer program product according to claim 5, further comprising computer readable program code means for causing said provider computer to update said mapped portion in said shared memory with more data.

8. A system for increasing data throughput between computers comprising a multi processor system, comprising:

a provider computer and a consumer computer linked via communication means for communication;

a master processor means linked via said communications means to said provider and consumer computers for controlling communications between said provider and consumer computers;

a shared memory means linked to said provider computer and to said consumer computer for the transmission of information between said provider computer and said consumer computer; and computer program product means for use by said master processor means, said provider computer and said consumer computer to increase data throughput between said provider and consumer computers, said product means including:
  i) computer readable program means for causing a portion in said shared memory having a particular address to be mapped for the transference of said data thereto;
  ii) computer readable program means for communicating the address of said portion to said computers;
  iii) computer readable program means for transmitting a first signal to said provider computer that said consumer computer is ready to receive and extract data from said shared memory;
  iv) computer readable program code means for instructing said provider computer after receipt of said first signal to transfer said data to said mapped portion at said address in said shared memory;
  v) computer readable program means for transmitting a second signal from said provider computer to said consumer computer that said data is available in said mapped portion for extraction by said consumer computer;
  vi) computer readable program code means for allowing said consumer computer to extract said data from said mapped portion in said shared memory after receipt of said second signal; and
  vii) computer readable program code means for transmitting a third signal from said consumer computer to said provider computer that said data has been extracted.

9. The system according to claim 8, further comprising computer readable program code means for allowing the size of said shared memory to be consumed by said data to be modified by user input in accordance with the amount of said data to be transferred.

10. The system according to claim 8, wherein said computer program product means further comprises computer readable program code means for instructing said computers to allocate a portion of their local memory for said data.

11. The system according to claim 8, wherein said computer program product means further comprises computer readable program code means for instructing said provider computer to update said mapped portion in said shared memory with more data.

* * * * *